May 21, 1957  B. R. BENJAMIN  2,792,633
DEVICE FOR TESTING PNEUMATIC TIRES
Filed Aug. 12, 1953
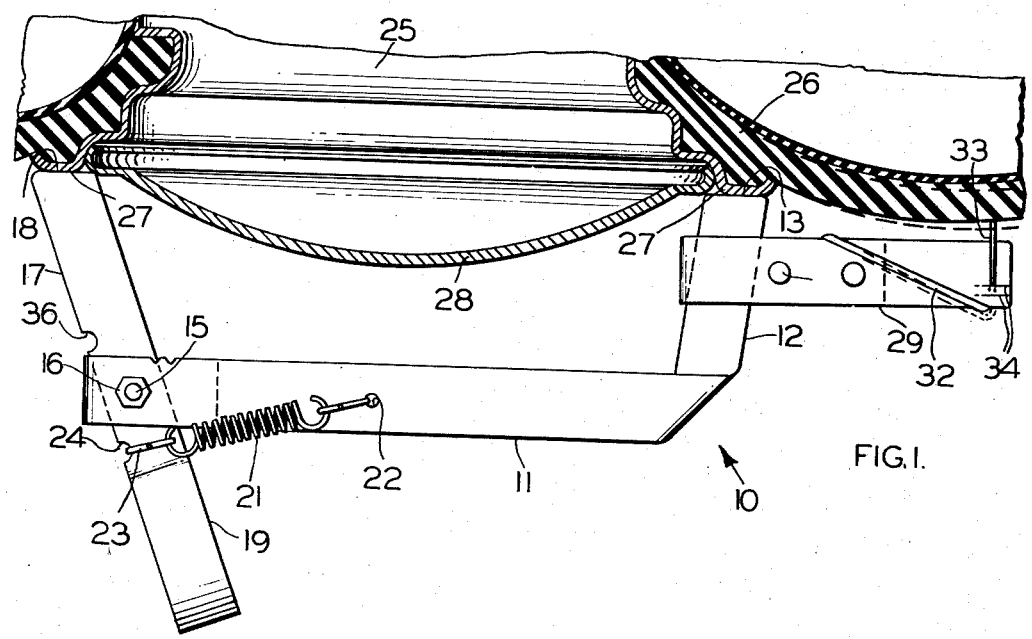
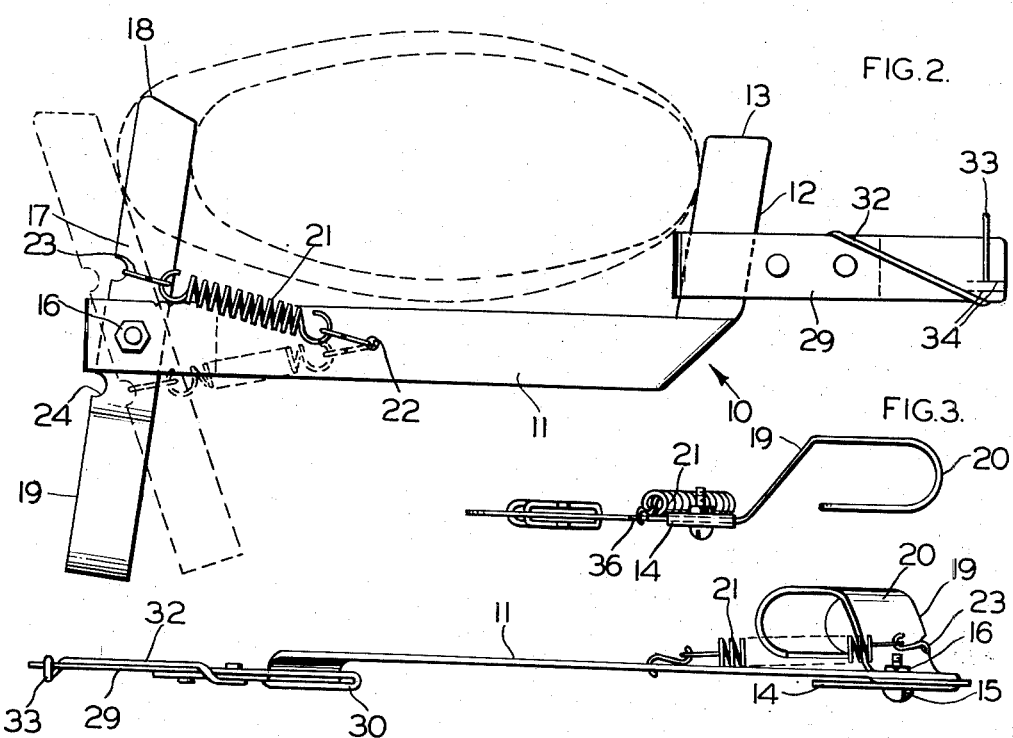
INVENTOR
BERT R. BENJAMIN
BY
ATTORNEY United States Patent Office 2,792,633
Patented May 21, 1957

2,792,633
DEVICE FOR TESTING PNEUMATIC TIRES
Bert R. Benjamin, Oak Park, Ill.
Application August 12, 1953, Serial No. 373,765
10 Claims. (Cl. 33—149)

This invention relates to the testing of pneumatic tires for automobiles and other vehicles, and particularly to a novel mechanism for determining the proper degree of inflation for a pneumatic tire under load to assure maximum wear and safety.

So-called low pressure tires are currently in wide use on automobiles and other vehicles, and are recommended by tire and automobile manufacturers and dealers for their improved riding qualities. For tires of this type, manufacturers, dealers and service station attendants and others generally sponsor pressures as low as 24 pounds without regard to variations in load or other factors such as the age and physical condition of the tire. I have found that many low pressure automobile or truck tires inflated to only 24 pounds pressure wear out very rapidly. The result of under-inflation with respect to the load on the tire is that the marginal edge portions of the road-engaging crown will bear most heavily on the road, and the transversely central portion of the tread will tend to bulge radially inwardly and contact the road very lightly. The consequences are two-fold. The tread, instead of wearing uniformly, wears the greatest at the transverse marginal edges, and since the tire is subjected to severe flexing the reinforcing fibers are stretched and the side walls weakened.

Obviously, if the air in such a weakened tire is maintained at low pressure, the tire will tend to collapse more and more as the walls of the tire weaken, and the wearing of the tire increases to such an extent that its useful life is shortened considerably. On the other hand, an over-inflated tire has too small an area of contact with the ground, and is subject to skidding on slick surfaces, and the central ribs of the tread receive the most wear.

Furthermore, according to the instructions of tire and automobile manufacturers and others the air pressure recommended for a low pressure tire is not the same when the tire is cold as when it is hot, for the reason that when the air in the tire becomes heated it expands and increases the pressure, and to maintain proper air pressure under varying atmospheric conditions frequent checking is necessary. I have found that a high percentage of the tire gauges in use by service stations and garages are inaccurate, thus adding to the difficulties in the way of determining the air pressure in the tire. Also, in most automobiles there is a decided differential between the static loads upon the front and rear wheels, and this differential varies according to the make and model of the vehicle. Further, since the required inflation varies with the strength of the tire walls, the load, the temperature and the altitude at which the vehicle is operated, these difficulties are greatly increased.

I have discovered that the configuration of a pneumatic tire under load bears a direct relationship to the air pressure and varies with the load as well as with atmospheric pressure and the temperature of the tire. The change in configuration of the tire under load has two measurable manifestations by which it can be determined whether the air pressure in the tire will result in optimum conditions of wear and safety. One of these is the flattening of the ground contacting area of the periphery of the tire, resulting in a measurable ground contact pattern, and the other is the radial bulge in the lower or ground-engaging portion of the tire as compared with the normal bulge apparent in other parts of the tire remote from the ground-engaging area.

The present invention, therefore, has for its object the provision of a novel mechanism for determining within narrow limits the proper degree of inflation of a vehicle tire under varying conditions to secure maximum wear and safety.

Another object of the invention is the provision of novel means for quickly and easily checking a tire by measuring the change in configuration under load of the ground engaging area.

A further object of the invention is the provision of novel and simple measuring means which may be applied to a loaded tire at any time with maximum accuracy and a minimum loss of time, to determine whether or not the tire is properly inflated.

Other objects and advantages of the invention will become clear from the following detailed description when read in conjunction with the accompanying drawings, wherein Figure 1 is a plan view of a device incorporating the features of this invention as applied to measuring the bulge of a tire, the latter being shown in section;

Figure 2 is a plan view of the device of this invention as applied to determining the correct air pressure in a vehicle tire by measuring the length of the contact pattern made by the tire on the ground;

Figure 3 is an end elevation of the structure shown in Figures 1 and 2, and

Figure 4 is a frontal elevation thereof.

Referring to the drawings, it will be observed that the numeral 10 designates generally the device of this invention, which is made of metal from thin, relatively rigid stock. The measuring device 10 comprises a main body section 11 bent at one end generally at right angles, preferably slightly obtuse, to the part 11 to form an arm 12, the outer flattened edge 13 of which is substantially parallel to the part 11. The other end of the body 11 is bent downwardly and inwardly upon itself, as indicated in Figures 3 and 4 to form a loop 14 in which is mounted a pivot bolt 15 and nut 16.

Another arm 17 at the end of main body 11 opposite arm 12 is pivoted on the bolt 15 and confined in the loop 14. The arm 17 has an outer flattened edge 18 shown in alignment with edge 13 in Figure 1 and parallel to the edges of the main body 11. An extension 19 of the arm 17 on the opposite side of pivot bolt 15 is bent upwardly away from the plane of arm 17 and main body 11 and is bent upon itself to form a loop 20, serving as a handle, as will hereinafter appear.

In the position of the parts in Figure 1 a spring 21, anchored at one end in an opening 22 provided in the body 11, has a hook 23 at its other end for engagement in a recess 24 in the outer edge of arm 17 on one side of the pivot 15 to hold the parts in the selected position. Engagement of the outer edge of the arm with the end of the loop 14 serves as a stop, whether the spring 21 is in the position of Figure 1 or of Figure 2.

In Figure 1, the device of this invention is illustrated as applied to the determination of air pressure in a tire by measuring the radial bulge thereof; that is, the amount the central portion of the side wall of the tire extends beyond the rim of the wheel upon which it is mounted. The wheel is designated by the numeral 25, the tire by 26 and the outer edge of the wheel rim by numeral 27, the hub cap being designated at 28.

An adjustable member 29 mounted on arm 12 of the device is made of the same thin, flat stock. Member 29 extends outwardly generally parallel to the main body 11 and substantially at right angles to arm 12. Member 29 has one end thereof bent upon itself to form a loop 30 in which is slidably and frictionally received the arm 12. The bent end of the member 29 is affixed thereto by one or more bolts or rivets 31, one of which serves as the anchor for one end of a flexible member 32. The member 32 is wound helically about the part 29 and terminates in a loop or movable part 33 extending at right angles to the member 29 and straddling the end thereof. The flexible member 32 is preferably made of spring steel and hugs the edges of the member 29 so that the loop end of the part 33 projects beyond the forward edge of member 29 and yields relative to member 29 upon engagement with the side wall of the tire 26. The end of the spring or flexible part 32 forming the loop 33 terminates adjacent indicia 34 on the member 29 and the extent of movement of the part 33 relative to the member 29 is indicated by the proximity of said end of the spring to one or another of said indicia 34.

When it is desired to measure the bulge of the tire 26 the operator determines the differential between the radial bulge of the tire immediately above its center of contact with the ground and in the area above the ground; that is, between the normal bulge and the abnormal bulge resulting from the pressure of the tire on the ground. To do this he subtends a chord of the circle represented by the rim of the wheel 25, as indicated in Figure 1, placing the outer edge 18 of arm 17 flat against the rim 27 and edge 13 of arm 12 flat against the rim at some location away from the ground engaging area. The member 29 is adjusted on arm 12 until part 33 engages the side wall of the tire. The same procedure is then followed with the part 33 engaging the maximum bulge in the side wall of the tire adjacent the area of contact thereof with the ground. Since the bulge of the tire is greater in this area the part 33 is depressed to an extent indicated by dotted lines in Figure 1. The space between indicia 34 indicates the amount of bulge that will provide a tire of most favorable configuration; that is, the air pressure in the tire is right for best wear and safety. The spring 21 may be discarded, if desired, and nut 16 tightened to hold arm 17 in a selected adjusted position to accommodate variations in rim size. Indicia 34 are provided to assist in adjusting the arm 17.

To use the device of this invention to determine the length of the contact pattern made by the pressure of the tire on the ground, the operator proceeds in the manner indicated in Figure 2. In Figure 2 the device is shown as applied to the determination of air pressure by measuring the length of the contact pattern. In this instance I have found that the contact pattern of a tire may vary between 8 and 9 inches in length for the class of tires having an overall diameter of 30 inches or more, these figures being applicable to the tires and wheels supplied for all of the passenger cars in this country. A contact pattern of approximately 7 to 8 inches in length is preferable where the lighter group of cars is concerned having a wheel and tire diameter of approximately 26 to 30 inches. It should be understood, of course, that these figures apply to the popular group of standard cars, and they would have to be modified for very small cars of the substandard and midget class.

The device is grasped by the handle 19 and held with the arms or blades 13 and 18 flat on the ground. The arms 13 and 18 are then pushed under the standing tire at front and rear thereof, the thinness of the material permitting insertion of the arms in the space between the tire and the ground at front and rear thereof with a minimum play.

As already noted, arm 17 is swingable in a horizontal plane between the solid and dotted line positions of Figure 2. The length of the short oval is approximately 8 inches and that of the long oval approximately 9 inches. The difference is the permissible variation in contact pattern a tire makes without impairing the wear and safety properties of the tire.

In Figure 1 and the dotted line position of Figure 2, the arms of the device are in their widest spaced position with the spring hook 23 anchored in recess 24. Another recess 36 is provided on the other side of bolt 15 in which the hook 23 may be anchored when it is desired to use the device for some time in the solid line position of Figure 2. This may occur when it is desired to measure a number of tires after they have been driven for some time and have become heated, expanding the air therein and increasing the pressure.

It is believed that the operation of the apparatus of this invention will be clearly understood from the foregoing description. It should likewise be understood that the invention has been described in one embodiment thereof, and that modifications may be made therein without departing from the spirit of the invention or the scope of the appended claims.

I claim:

1. A device for determining the effect of air pressure upon a pneumatic tire mounted on a wheel at rest upon the surface of the ground, comprising a generally U-shaped member having an elongated base portion, arms extending generally at right angles to the base having their outer edges flattened and substantially in alignment, said arms being adapted to subtend an arc of the circle represented by the rim of the wheel upon which the tire is mounted with the outer edges of the arms engaging the radially outer edges of the rim, an adjustable member mounted on one of said arms extending generally parallel to the plane of the wheel radially to a location adjacent the center of the side wall of the tire, a movable part on said adjustable member projecting therefrom axially of the wheel and engageable with the side wall of the tire, said member being movable to an amount equal to the difference in radial bulge between the upper and lower parts of the tire.

2. The invention set forth in claim 1, wherein one of said arms is pivoted on the base for swinging movement thereof toward and away from the other arm to adjust the spacing therebetween.

3. The invention set forth in claim 2, wherein said pivoted arm has an extension on the opposite side of the base portion adapted to serve as a handle.

4. A device for determining the effect of air pressure upon a pneumatic tire mounted on a wheel at rest upon the surface of the ground, comprising a generally U-shaped member having an elongated base portion, arms extending generally at right angle to the base having their outer edges flattened and substantially in alignment, said arms being adapted to subtend an arc of the circle represented by the rim of the wheel upon which the tire is mounted with the outer edges of the arms engaging the radially outer edges of the rim, one of said arms being rigid and the other arm being pivoted on the base portion for swinging movement thereof toward and away from the other arm to adjust the spacing therebetween, an adjustable member mounted on one of said arms extending generally parallel to the plane of the wheel radially to a location adjacent the center of the side wall of the tire, a movable part on said adjustable member projecting therefrom and movable axially of the wheel and engageable with the side wall of the tire, said member being movable to an amount equal to the difference in radial bulge between that portion of the tire adjacent the ground and the upper portion thereof, a spring anchored at one end to the base portion and optionally attachable at its other end to said pivoted arm at opposite sides of said pivot to bias the pivoted arm in one direction or the other with respect to the other said arm.

5. The invention set forth in claim 4, wherein means are provided for limiting the pivotal movement of said arm.

6. The invention set forth in claim 1, wherein said movable part is spring pressed and yieldable upon engagement with the bulge in the side wall of the tire.

7. The invention set forth in claim 6, wherein indicia are provided on said adjustable member indicating the position of the movable part relative thereto, whereby the differences in radial bulge in the side wall of the tire may be determined.

8. A device for determining the effect of air pressure upon a pneumatic tire mounted on a wheel at rest upon the surface of the ground, comprising a generally U-shaped member having an elongated base portion, arms extending generally at right angles to the base having their outer edges flattened and substantially in alignment, said arms being adapted to subtend an arc of the circle represented by the rim of the wheel upon which the tire is mounted with the outer edges of the arms engaging the radially outer edges of the rim, an adjustable member mounted on one of said arms extending generally parallel to the plane of the wheel radially to a location adjacent the center of the side wall of the tire, a movable part on said adjustable member projecting therefrom axially of the wheel and engageable with the side wall of the tire, said member being movable to an amount equal to the difference in radial bulge between the upper and lower parts of the tire, and said arms being made of thin, flat, relatively rigid stock, the spacing therebetween being such that they are slidable between the tire and the ground at front and rear thereof when the length of the pattern made by the tire upon the ground is not greater than the distance between said arms.

9. A device for determining the effect of air pressure upon a pneumatic tire mounted on a wheel at rest upon the surface of the ground, comprising a generally U-shaped member having an elongated base portion, spaced arms at the ends of said base extending generally at right angles thereto, one of said arms being substantially stationarily affixed to said base, means pivotally connecting the other arm to said base medially of its ends to provide a portion thereon on one side of the base spaced from the other said arm and a handle portion projecting from the other side of said base, said arms being of relatively rigid stock adapted to lie flat upon the ground and slidable between the tire and the ground at front and rear thereof when the length of the contact pattern of the tire upon the ground is not greater than the distance between said arms, said other arm being pivotable to vary the spacing between said arms, and spring means connected to said base and to said other arm on one side of the pivotal connection thereof to the base to bias said arm in one direction.

10. The invention set forth in claim 9, wherein means are provided accommodating connection of said spring means to said other arm on the other side of said pivotal connection to bias said arm in the opposite direction.

References Cited in the file of this patent

UNITED STATES PATENTS

| | | |
|---|---|---|
| 1,238,535 | Lewis | Aug. 28, 1917 |
| 1,816,464 | Biggert | July 28, 1931 |
| 2,261,503 | Morris | Nov. 4, 1941 |

FOREIGN PATENTS

| | | |
|---|---|---|
| 16,544 | Great Britain | July 15, 1909 |
| 506,413 | France | May 28, 1920 |